United States Patent
Wu et al.

(10) Patent No.: US 10,506,565 B2
(45) Date of Patent: Dec. 10, 2019

(54) CHANNEL FEEDBACK INFORMATION TRANSMISSION METHOD AND APPARATUS

(71) Applicant: HUAWEI TECHNOLOGIES CO., LTD., Shenzhen (CN)

(72) Inventors: Tao Wu, Shenzhen (CN); Linjun Lv, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 342 days.

(21) Appl. No.: 15/395,571

(22) Filed: Dec. 30, 2016

(65) Prior Publication Data

US 2017/0111902 A1 Apr. 20, 2017

Related U.S. Application Data

(63) Continuation of application No. PCT/CN2015/074922, filed on Mar. 24, 2015.

(30) Foreign Application Priority Data

Aug. 14, 2014 (CN) .......................... 2014 1 0401147

(51) Int. Cl.
*H04W 72/04* (2009.01)
*H04B 7/06* (2006.01)
*H04L 1/00* (2006.01)

(52) U.S. Cl.
CPC ...... *H04W 72/0413* (2013.01); *H04B 7/0658* (2013.01); *H04L 1/0026* (2013.01); *H04L 1/0029* (2013.01); *H04W 72/0486* (2013.01)

(58) Field of Classification Search
CPC ...................... H04W 72/0413; H04W 72/0486
See application file for complete search history.

(56) References Cited

U.S. PATENT DOCUMENTS

2011/0244847 A1 10/2011 Mallik et al.
2012/0027140 A1* 2/2012 Weng .................. H04L 25/0232
375/350

(Continued)

FOREIGN PATENT DOCUMENTS

CN 101388864 A 3/2009
CN 101888646 A 11/2010

(Continued)

OTHER PUBLICATIONS

Notice of Allowance, dated Nov. 1, 2018, in Chinese Application No. 20140401147.1 (1 pg.).

(Continued)

*Primary Examiner* — Anh Vu H Ly
*Assistant Examiner* — Hector Reyes
(74) *Attorney, Agent, or Firm* — Fish & Richardson P.C.

(57) ABSTRACT

A channel feedback information transmission method is disclosed. A terminal performs channel estimation on a subcarrier on which a downlink pilot is located, and obtains first channel information; the terminal performs a channel interpolation calculation on a channel of a data subcarrier according to the first channel information, and obtains second channel information according to a result of the channel interpolation calculation; the terminal determines a feedback factor; the terminal obtains third channel information from the second channel information according to the feedback factor, where an amount of the third channel information is less than an amount of the second channel information; and the terminal feeds back the third channel information to a base station. Some channel information is selected and fed back by means of a feedback factor.

20 Claims, 10 Drawing Sheets

(56) References Cited

U.S. PATENT DOCUMENTS

| | | |
|---|---|---|
| 2013/0182596 A1 | 7/2013 | Lee et al. |
| 2013/0336160 A1 | 12/2013 | Yin et al. |
| 2014/0140428 A1* | 5/2014 | Khojastepour ... H04L 25/03898 375/267 |
| 2014/0204782 A1 | 7/2014 | Geirhofer et al. |
| 2016/0065344 A1* | 3/2016 | Lee .................. H04B 7/0626 370/329 |
| 2016/0072569 A1 | 3/2016 | Yang et al. |
| 2017/0005714 A1* | 1/2017 | Lu ..................... H04W 72/085 |

FOREIGN PATENT DOCUMENTS

| | | |
|---|---|---|
| CN | 102014509 A | 4/2011 |
| CN | 102263613 A | 11/2011 |
| CN | 102549939 A | 7/2012 |
| CN | 103294558 A | 9/2013 |
| CN | 103596288 | 2/2014 |
| CN | 104168050 A | 11/2014 |
| CN | 104521304 A | 4/2015 |
| EP | 2434835 A1 | 3/2012 |
| WO | 2011/044526 A1 | 4/2011 |
| WO | 2011/123976 A1 | 10/2011 |

OTHER PUBLICATIONS

Issue Notification, dated Nov. 1, 2018, in Chinese Application No. 20140401147.1 (4 pp.).

International Search Report dated Jul. 1, 2015 in corresponding International Patent Application No. PCT/CN2015/074922.

Extended European Search Report dated Jun. 30, 2017 in corresponding European Patent Application No. 15831853.5.

Kang Jinku et al: "Joint Signal and Channel State Information Compression for the Backhaul of Uplink Network MIMO Systems," IEEE Transactions on Wireless Communications, IEEE Service Center, Piscataway, NJ, US, vol. 13, No. 3, Mar. 1, 2014, pp. 1555-1567, XP011543845.

* cited by examiner

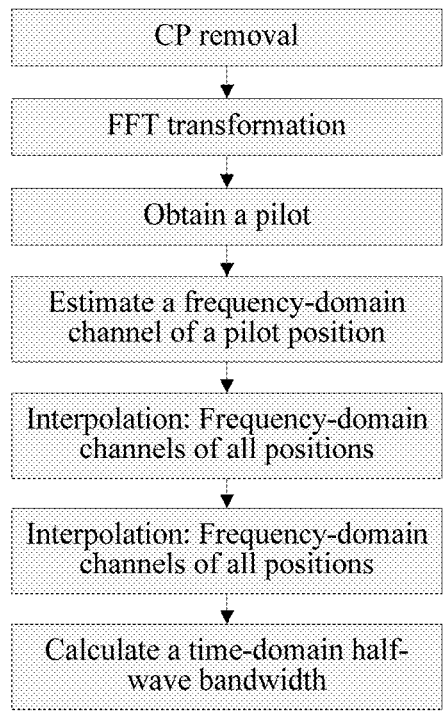

FIG. 4a

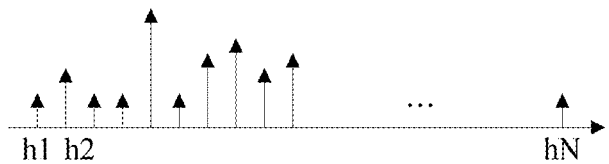

FIG. 4b

| A base station obtains a load ratio of a radio transmission link, where the load ratio is a ratio of an information exchange amount to a link capacity | ～ 301 |

| When the load ratio is greater than or equal to a first preset value, the base station extracts, according to a first feedback factor, first channel feedback information from channel information fed back by a terminal, and transmits the first channel feedback information to a data center | ～ 302 |

FIG. 5

CHANNEL FEEDBACK INFORMATION TRANSMISSION METHOD AND APPARATUS

CROSS-REFERENCE TO RELATED APPLICATIONS

This application is a continuation of International Application No. PCT/CN2015/074922, filed on Mar. 24, 2015, which claims priority to Chinese Patent Application No. 201410401147.1, filed on Aug. 14, 2014. The disclosures of the aforementioned applications are hereby incorporated by reference in their entireties.

TECHNICAL FIELD

Embodiments of the present application relate to the communications field, and in particular, to a channel feedback information transmission method.

BACKGROUND

A wireless communications network already evolves over four generations, and a technical route of evolution of the wireless communications network is: from macro base station and macro cell networking to micro base station and micro cell networking, and then to high-power dense networking. Regardless of which networking manner, signal interference between different cells is always a problem needs to be handled.

Based on the foregoing technical route, in a wireless communications system of the high-power dense networking, neither a cell nor a sector is centered on a base station, because signal coverage areas overlap between different base stations. Therefore, a user is jointly covered by multiple base stations, and with collaboration between the base stations, a signal power can be obviously increased, but much interference also exists. To perform interference cancellation and suppression, a channel state needs to be accurately estimated and fed back.

However, in such a scenario of dense networking and high-power coverage, an OFDM (Orthogonal Frequency Division Multiplexing) physical layer technology is used in the prior art. Because a channel feedback amount is very large, causing very large wireless transmission overheads, system performance is relatively low.

SUMMARY

Embodiments of the present application provide a channel feedback information transmission method and apparatus, so as to reduce overheads of a wireless transmission feedback.

A first aspect of the embodiments of the present application discloses a channel feedback information transmission method, where the method includes:

performing, by a terminal, channel estimation on a sub-carrier on which a downlink pilot is located, and obtaining first channel information;

performing, by the terminal, a channel interpolation calculation on a channel of a data subcarrier according to the first channel information, and obtaining second channel information according to a result of the channel interpolation calculation;

determining, by the terminal, a feedback factor;

obtaining, by the terminal, third channel information from the second channel information according to the feedback factor, where an amount of the third channel information is less than an amount of the second channel information; and feeding back, by the terminal, the third channel information to a base station.

With reference to the first aspect, in a first possible implementation manner of the first aspect, the determining, by the terminal, a feedback factor includes:

calculating, by the terminal, a channel variance according to the second channel information; and determining, by the terminal, the feedback factor according to the channel variance and the result of the channel interpolation calculation.

With reference to the first aspect, in a second possible implementation manner of the first aspect, the determining, by the terminal, a feedback factor includes: determining, by the terminal, the feedback factor according to a time-domain half-wave bandwidth of the second channel information.

A second aspect of the embodiments of the present application discloses a channel feedback information transmission method, where the method includes:

obtaining, by a base station, a load ratio of a radio transmission link, where the load ratio is a ratio of an information exchange amount to a link capacity, where the information exchange amount is an amount of information exchange between the base station and a data center within a preset period of time, and the link capacity is an amount of containable information in a link from the base station to the data center within a preset period of time; and when the load ratio is greater than or equal to a first preset value, extracting, by the base station according to a first feedback factor, first channel feedback information from channel information fed back by a terminal, and transmitting the first channel feedback information to the data center.

With reference to the second aspect, in a first possible implementation manner of the second aspect, the extracting, by the base station according to a first feedback factor, first channel feedback information from channel information fed back by a terminal, and transmitting the first channel feedback information to the data center specifically includes:

obtaining, by the base station, a second feedback factor according to a preset proportion and the first feedback factor; and extracting, by the base station according to the second feedback factor, second channel feedback information from the channel information fed back by the terminal, and transmitting the second channel feedback information to the data center, where the second feedback factor is greater than the first feedback factor.

With reference to the second aspect, in a second possible implementation manner of the second aspect, the method further includes:

when the load ratio is less than the first preset value, extracting, by the base station according to a third feedback factor, third channel feedback information from the channel information fed back by the terminal, and transmitting the third channel feedback information to the data center, where the third feedback factor is less than the first feedback factor.

A third aspect of the embodiments of the present application discloses a channel feedback information transmission method, where the method includes:

determining, by a base station, a change rate of a channel according to information about the channel fed back by a terminal; and when the change rate of the channel is greater than or equal to a first preset value, feeding back, by the base station, the information about the channel to a data center according to a first preset frequency.

With reference to the third aspect, in a first possible implementation manner of the third aspect, the method further includes:

when the change rate of the channel is less than the first preset value, feeding back, by the base station, the information about the channel to the data center according to a second preset frequency, where the second preset frequency is less than the first preset frequency.

A fourth aspect of the embodiments of the present application discloses a channel feedback information transmission method, where the method includes:

performing, by a base station, channel estimation on a subcarrier on which an uplink pilot is located, and obtaining first channel information;

performing, by the base station, a channel interpolation calculation on a channel of a data subcarrier according to the first channel information, and obtaining second channel information according to a result of the channel interpolation calculation;

determining, by the base station, a feedback factor;

obtaining, by the base station, third channel information from the second channel information according to the feedback factor, where an amount of the third channel information is less than an amount of the second channel information; and feeding back, by the base station, the third channel information to a data center.

With reference to the fourth aspect, in a first possible implementation manner of the fourth aspect, the determining, by the base station, a feedback factor includes:

calculating, by the base station, a channel variance according to the second channel information; and determining, by the base station, the feedback factor according to the channel variance and the result of the channel interpolation calculation.

With reference to the fourth aspect, in a second possible implementation manner of the fourth aspect, the determining, by the base station, a feedback factor includes: determining, by the base station, the feedback factor according to a time-domain half-wave bandwidth of the second channel information.

A fifth aspect of the embodiments of the present application discloses a terminal, where the terminal includes:

a first obtaining unit, configured to perform channel estimation on a subcarrier on which a downlink pilot is located, and obtain first channel information;

a calculation unit, configured to perform a channel interpolation calculation on a channel of a data subcarrier according to the first channel information obtained by the obtaining unit, and obtain second channel information according to a result of the interpolation calculation;

a determining unit, configured to determine a feedback factor;

a second obtaining unit, configured to obtain third channel information from the second channel information according to the feedback factor determined by the determining unit, where an amount of the third channel information is less than an amount of the second channel information; and a feedback unit, configured to feed back the third channel information obtained by the second obtaining unit to a base station.

With reference to the fifth aspect, in a first possible implementation manner of the fifth aspect, the determining unit includes a calculation subunit and a determining subunit, where the calculation subunit is configured to calculate a channel variance according to the second channel information obtained by the calculation unit; and the determining subunit is configured to determine the feedback factor according to the channel variance and the result of the channel interpolation calculation.

With reference to the fifth aspect, in a second possible implementation manner of the fifth aspect, the determining unit is specifically configured to determine the feedback factor according to a time-domain half-wave bandwidth of the second channel information.

A sixth aspect of the embodiments of the present application discloses a base station, where the base station includes:

an obtaining unit, configured to obtain a load ratio of a radio transmission link, where the load ratio is a ratio of an information exchange amount to a link capacity, where the information exchange amount is an amount of information exchange between the base station and a data center within a preset period of time, and the link capacity is an amount of containable information in a link from the base station to the data center within a preset period of time; and a first extraction unit, configured to: when the load ratio is greater than or equal to a first preset value, extract, according to a first feedback factor, first channel feedback information from channel information fed back by a terminal, and transmit the first channel feedback information to the data center. With reference to the sixth aspect, in a first possible implementation manner of the sixth aspect, the first extraction unit includes a calculation subunit and an extraction subunit, where the calculation subunit is configured to obtain a second feedback factor according to a preset proportion and the first feedback factor when the load ratio is greater than or equal to the first preset value; and the extraction subunit is configured to extract, according to the second feedback factor, second channel feedback information from the channel information fed back by the terminal, and transmit the second channel feedback information to the data center, where the second feedback factor is greater than the first feedback factor.

With reference to the sixth aspect or the first possible implementation manner of the sixth aspect, in a second possible implementation manner of the sixth aspect, the base station further includes a second extraction unit, where the second extraction unit is configured to: when the load ratio is less than the first preset value, extract, by the base station according to a third feedback factor, third channel feedback information from the channel information fed back by the terminal, and transmit the third channel feedback information to the data center, where the third feedback factor is less than the first feedback factor.

A seventh aspect of the embodiments of the present application discloses a base station, where the base station includes:

a determining unit, configured to determine a change rate of a channel according to information about the channel fed back by a terminal; and a first feedback unit, configured to: when the change rate of the channel is greater than or equal to a first preset value, feed back, by the base station, the information about the channel to a data center according to a first preset frequency.

With reference to the seventh aspect, in a first possible implementation manner of the seventh aspect, the base station further includes a second feedback unit, where the second feedback unit is configured to: when the change rate of the channel is less than the first preset value, feed back, by the base station, the information about the channel to the data center according to a second preset frequency, where the second preset frequency is less than the first preset frequency.

An eighth aspect of the embodiments of the present application discloses a base station, where the base station includes:

a first obtaining unit, configured to perform channel estimation on a subcarrier on which an uplink pilot is located, and obtain first channel information;

a calculation unit, configured to perform a channel interpolation calculation on a channel of a data subcarrier according to the first channel information obtained by the obtaining unit, and obtain second channel information according to a result of the interpolation calculation;

a determining unit, configured to determine a feedback factor;

a second obtaining unit, configured to obtain third channel information from the second channel information according to the feedback factor, where an amount of the third channel information is less than an amount of the second channel information; and a feedback unit, configured to feed back the third channel information obtained by the second obtaining unit to a data center.

With reference to the eighth aspect, in a first possible implementation manner of the eighth aspect, the determining unit includes a calculation subunit and a determining subunit, where the calculation subunit is configured to calculate a channel variance according to the second channel information obtained by the calculation unit; and the determining subunit is configured to determine the feedback factor according to the channel variance and the result of the channel interpolation calculation.

With reference to the eighth aspect, in a second possible implementation manner of the eighth aspect, the determining unit is specifically configured to determine the feedback factor according to a time-domain half-wave bandwidth of the second channel information.

With reference to the first aspect and the fifth aspect, it may be known that, according to the channel feedback information transmission method and the terminal provided in the embodiments of the present application, the terminal obtains third channel information from the second channel information according to the feedback factor, and the terminal feeds back the third channel information to a base station. Some channel information is selected and fed back by means of a feedback factor, so that a balance between performance of a communications system and channel feedback transmission overheads is reached, thereby improving efficiency of a communications system.

With reference to the second aspect and the sixth aspect, it may be known that, according to the channel feedback information transmission method and the base station provided in the embodiments of the present application, the base station obtains a load ratio of a radio transmission link, and when the load ratio is greater than or equal to a first preset value, the base station extracts, according to a first feedback factor, first channel feedback information from channel information fed back by a terminal. Some channel information is selected and fed back by means of a first feedback factor, so that a balance between a load of a radio transmission link and channel feedback transmission overheads is reached, thereby improving efficiency of a communications system.

With reference to the third aspect and the seventh aspect, it may be known that, according to the channel feedback information transmission method and the base station provided in the embodiments of the present application, when the change rate of the channel is greater than or equal to the first preset value, the base station feeds back the information about the channel to a data center according to a first preset frequency, and the base station determines, according to the change rate of the channel, a frequency at which channel information is fed back to the data center, thereby improving efficiency of a communications system.

With reference to the fourth aspect and the eighth aspect, it may be known that, according to the channel feedback information transmission method and the base station provided in the embodiments of the present application, the base station performs channel estimation on a subcarrier on which an uplink pilot is located, and obtains first channel information; the base station performs a channel interpolation calculation on a channel of a data subcarrier according to the first channel information, and obtains second channel information according to a result of the channel interpolation calculation; the base station obtains third channel information from the second channel information according to a feedback factor; and the base station feeds back the third channel information to a data center. Some channel information is selected and fed back by means of a feedback factor, so that a balance between performance of a communications system and channel feedback transmission overheads is reached, thereby improving efficiency of a communications system.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 4a is a flowchart of calculating a time-domain half-wave bandwidth according to an embodiment of the present application;

FIG. 4b is a schematic diagram of channel pulses according to an embodiment of the present application;

FIG. 5 is a flowchart of another channel feedback information transmission method according to an embodiment of the present application;

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
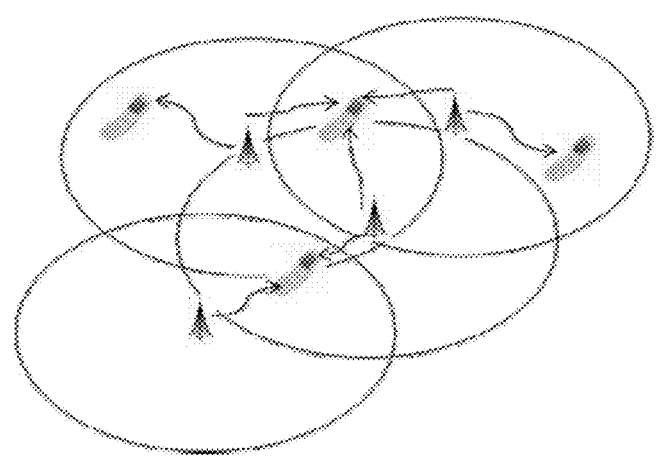
FIG. 1 is a flowchart of a channel feedback information transmission method according to an embodiment of the present application.

As shown in FIG. 1, FIG. 1 is a communications system based on dense wireless coverage. In the communications system, neither a cell nor a sector is centered on a base station, because there is very large overlap between coverage areas of base stations. In the communications system, signals between cells interfere with each other, and to more accurately perform interference cancellation and suppression, a channel state needs to be accurately estimated and fed back. If an OFDM (Orthogonal Frequency Division Multiplexing) physical layer technology is used, in such a scenario of dense networking and high-power coverage, a channel feedback amount is very large, so that wireless transmission overheads are very large, which is a technical problem that needs to be resolved.

Figure 2:
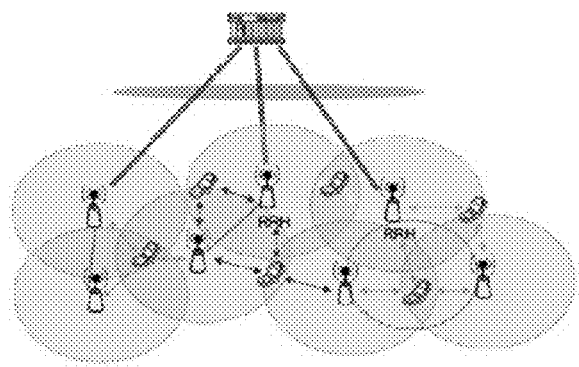
FIG. 2 is a flowchart of another channel feedback information transmission method according to an embodiment of the present application.

As shown in FIG. 2, FIG. 2 describes composition of a communications system based on dense wireless coverage. The communications system includes three parts: a lowest part is base station sites, where the base station sites are characterized by a high transmit power, signal coverage areas of the base station sites are greatly overlapped with each other, a cellular structure is not regular any more between the base station sites, and network topology networking may be randomly performed; a middle part is a wireless transmission part, where the wireless transmission part is connected to a centralized controller (or a data center) by means of an optical fiber, a microwave or the like; and an uppermost part is the centralized controller (or the data center), which is a centralized processing array as a whole, and has a function of calculating a signal waveform transmitted by each site and scheduling a user service. To accurately calculate a transmitted waveform, channel sounding of a user needs to be fed back to the data center by means of a wireless transmission network.

Figure 3:
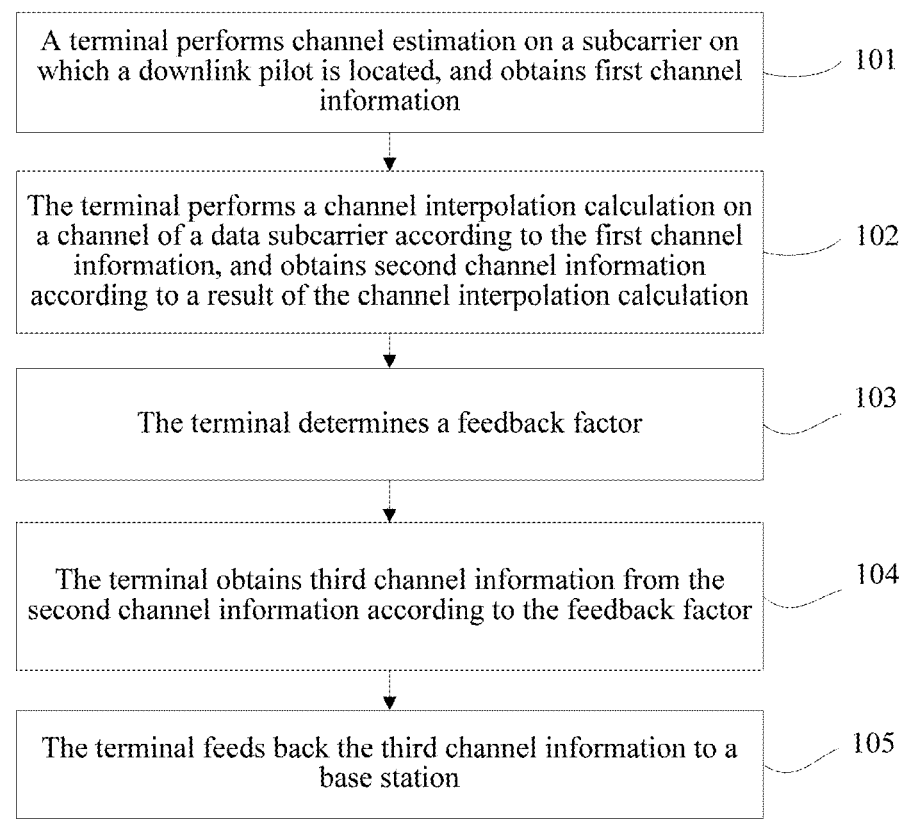
FIG. 3 is a flowchart of another channel feedback information transmission method according to an embodiment of the present application.

As shown in FIG. 3, FIG. 3 describes a channel feedback information transmission method according to an embodiment of the present application. The method is used to feed back channel information, and the method specifically includes step 101 to step 105.

101: A terminal performs channel estimation on a subcarrier on which a downlink pilot is located, and obtains first channel information.

The terminal may be an electronic device having a communications function, such as a smartphone or a tablet computer.

The terminal may perform, by using an algorithm, such as an MMSE (Minimum Mean Square Error) algorithm or an LS (Least Square) algorithm, the channel estimation on the subcarrier on which the downlink pilot is located.

The first channel information refers to a channel transmission function of the subcarrier on which the downlink pilot is located.

102: The terminal performs a channel interpolation calculation on a channel of a data subcarrier according to the first channel information, and obtains second channel information according to a result of the channel interpolation calculation.

After the channel transmission function of the pilot subcarrier is estimated, a channel response of the data subcarrier may be obtained by means of interpolation between adjacent pilot subcarriers. Commonly used interpolation algorithms include a linear interpolation algorithm, a second-order interpolation algorithm, a time-domain interpolation algorithm and other interpolation algorithms.

The second channel information refers to a channel transmission function of a pilot subcarrier and a channel transmission function of a data subcarrier.

103: The terminal determines a feedback factor.

The feedback factor may be understood as a proportion of a feedback. For example, if the feedback factor is 2, channel information of a resource element is fed back every two resource elements.

104: The terminal obtains third channel information from the second channel information according to the feedback factor, where an amount of the third channel information is less than an amount of the second channel information.

The terminal obtains all channel information by means of the channel estimation and the interpolation calculation, and if the channel information is all fed back to a base station, a large quantity of wireless feedback channel resources are occupied.

Therefore, the terminal may select some information from the second channel information as third channel information by means of the feedback factor.

The feedback factor may be preset, or may dynamically change according to the amount of the first channel information and the amount of the second channel information. For example, if the feedback factor is set to 3, a piece of third channel information of a resource element is determined every three REs (Resource Element).

105: The terminal feeds back the third channel information to a base station.

After a third channel on which a feedback needs to be performed is determined according to the feedback factor, channel information of the third channel is fed back to the base station by means of an uplink.

It may be known from above that, according to the channel feedback information transmission method provided in this embodiment of the present application, the terminal obtains third channel information from the second channel information according to the feedback factor, and the terminal feeds back the third channel information to a base station. Some channel information is selected and fed back by means of a feedback factor, so that a balance between performance of a communications system and channel feedback transmission overheads is reached, thereby improving efficiency of a communications system.

Figure 4:
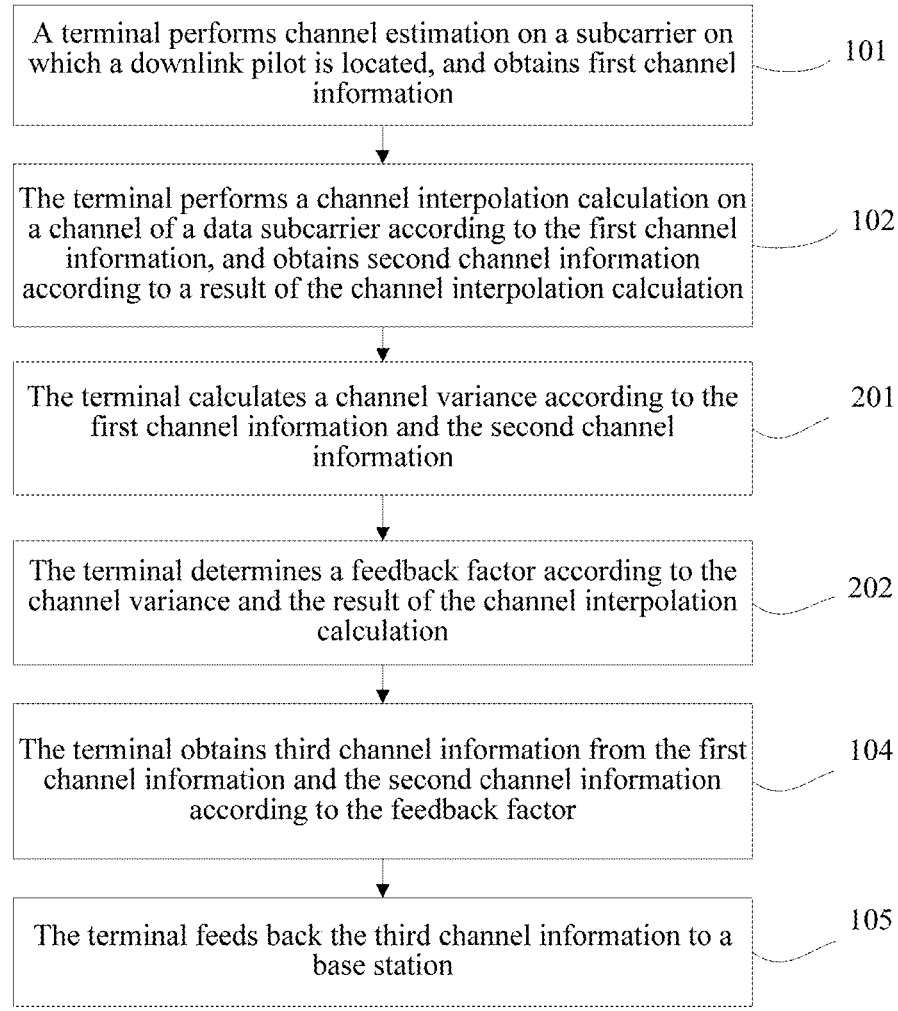
FIG. 4 is a flowchart of another channel feedback information transmission method according to an embodiment of the present application.

Optionally, as shown in FIG. 4, in another embodiment of the present application, step 103 specifically includes step 201 and step 202.

201: The terminal calculates a channel variance according to the second channel information.

The terminal calculates a channel of each subcarrier in a sub-band according to a channel interpolation algorithm, and then calculates a channel variance of the entire sub-band.

202: The terminal determines the feedback factor according to the channel variance and the result of the channel interpolation calculation.

The terminal determines and selects the feedback factor according to a relationship between the channel variance of the entire sub-band and the result of the channel interpolation calculation.

As time elapses, the feedback factor changes.

In a frequency band, the feedback factor is determined according to a performance requirement. Therefore, a compromise between performance of a communications system and channel feedback wireless transmission overheads may be achieved by determining the feedback factor.

Optionally, in another embodiment of the present application, step 103 specifically includes:

determining, by the terminal, the feedback factor according to a time-domain half-wave bandwidth of the second channel information.

A flowchart of calculating a time-domain half-wave bandwidth is shown in FIG. 4a, and a specific process is as follows:

It is assumed that, a length of a CP (cyclic prefix) of an OFDM system is K, and a size of an FFT (fast Fourier transformation) block is N. If an OFDM signal that is first input already completes synchronization, data obtained after CP removal is performed on the input signal: $x_1, x_2, \ldots, x_{K+N}$ is $x_{K+1}, x_{K+2}, \ldots, x_{K+N}$.

N pieces of data $x_{K+1}, x_{K+2}, \ldots, x_{K+N}$ is used as an input to perform an N-FFT transformation, and an output is: $X_{K+1}, X_{K+2}, \ldots, X_{K+N}$. In the N points, some positions are pilots. It is assumed that, L points of the N points are pilots, an LS or MMSE estimation is separately performed on the L points, that is, a frequency-domain channel estimation on each pilot position is completed: X=d×H+N, where X herein is data of the pilot position (that is, one piece of data of $X_{K+1}, X_{K+2}, \ldots, X_{K+N}$), H represents a frequency-domain channel of the pilot position, N represents frequency-domain noise of the pilot position, and is a Gaussian random variable satisfying that a variance is $\sigma^2$, and d is pilot data transmitted by the pilot position, and is data that is already known, for example, 1 or −1 or another complex number. The channel estimation: an LS algorithm: $H'=X(d^H d+\sigma^2)^{-1}d$.

After the frequency-domain channel of the pilot position is estimated, all frequency-domain channels of N positions are calculated by using an interpolation algorithm, and the interpolation algorithm includes an algorithm, such as Wiener filtering. Then, after an N-IFFT transformation is performed on the frequency-domain channel, channel pulses of a time domain are obtained: $h_1, h_2, \ldots, h_N$. Details are shown in FIG. 4b.

A time-domain half-wave bandwidth may be calculated in a manner similar to that a frequency-domain bandwidth is calculated. For example, it is assumed that W satisfies $|h_W| \geq |h_i|$ (i=1, 2, 3 ..., N). It is assumed that W1 satisfies a minimum subscript of $$|h_{W1}| \geq \frac{1}{\sqrt{2}}|h_W|,$$

and W2 satisfies a maximum subscript of $$|h_{W2}| \geq \frac{1}{\sqrt{2}}|h_W|.$$

$W_1 - W_2$ is calculated as the time-domain half-wave bandwidth. The larger bandwidth indicates that fluctuation of a frequency domain is larger, and the feedback factor is smaller (that is, a feedback needs to be performed on more channels). The smaller bandwidth indicates that fluctuation of the frequency domain is smaller, and the feedback factor is larger (that is, a feedback needs to be performed on fewer channels).

As shown in FIG. 5, FIG. 5 describes another channel feedback information transmission method according to an embodiment of the present application. The method is used to feed back channel information, and the method specifically includes step 301 to step 302.

301: A base station obtains a load ratio of a radio transmission link, where the load ratio is a ratio of an information exchange amount to a link capacity, where the information exchange amount is an amount of information exchange between the base station and a data center within a preset period of time, and the link capacity is an amount of containable information in a link from the base station to the data center within a preset period of time.

The base station may determine, by using the load ratio of the radio transmission link, whether a sufficient surplus capacity exists in the radio transmission link. When the surplus capacity is insufficient, the feedback factor is lowered, ensuring performance of a wireless communications system. When the feedback factor is not enough to support coordinated communication performance, an alarm is needed to notify the data center that a channel feedback is alarmed.

302: When the load ratio is greater than or equal to a first preset value, the base station extracts, according to a first feedback factor, first channel feedback information from channel information fed back by a terminal, and transmits the first channel feedback information to the data center.

The first feedback factor may be preset, or may dynamically change according to a change in the load ratio. For example, it is assumed that the first preset value is 50%. When the load ratio is 50% to 70%, a first feedback factor may be 3, and a piece of channel information is fed back every three REs, that is, a quarter of the channel information fed back by the terminal may be extracted as the first channel feedback information and be fed back. When the load ratio is 70% to 80%, the first feedback factor may be 4, that is, one fifth of the channel information fed back by the terminal may be extracted as the first channel feedback information and be fed back. When the load ratio is excessively high, and the channel information fed back according to the feedback factor is not enough to support the coordinated communication performance, an alarm is needed to notify the data center that a channel feedback is alarmed.

It may be known from above that, according to the channel feedback information transmission method provided in this embodiment of the present application, the base station obtains a load ratio of a radio transmission link, and when the load ratio is greater than or equal to a first preset value, the base station extracts, according to a first feedback factor, first channel feedback information from channel information fed back by a terminal. Some channel information is selected and fed back by means of a feedback factor, so that a balance between a load of a radio transmission link and channel feedback transmission overheads is reached, thereby improving efficiency of a communications system.

Figure 6:
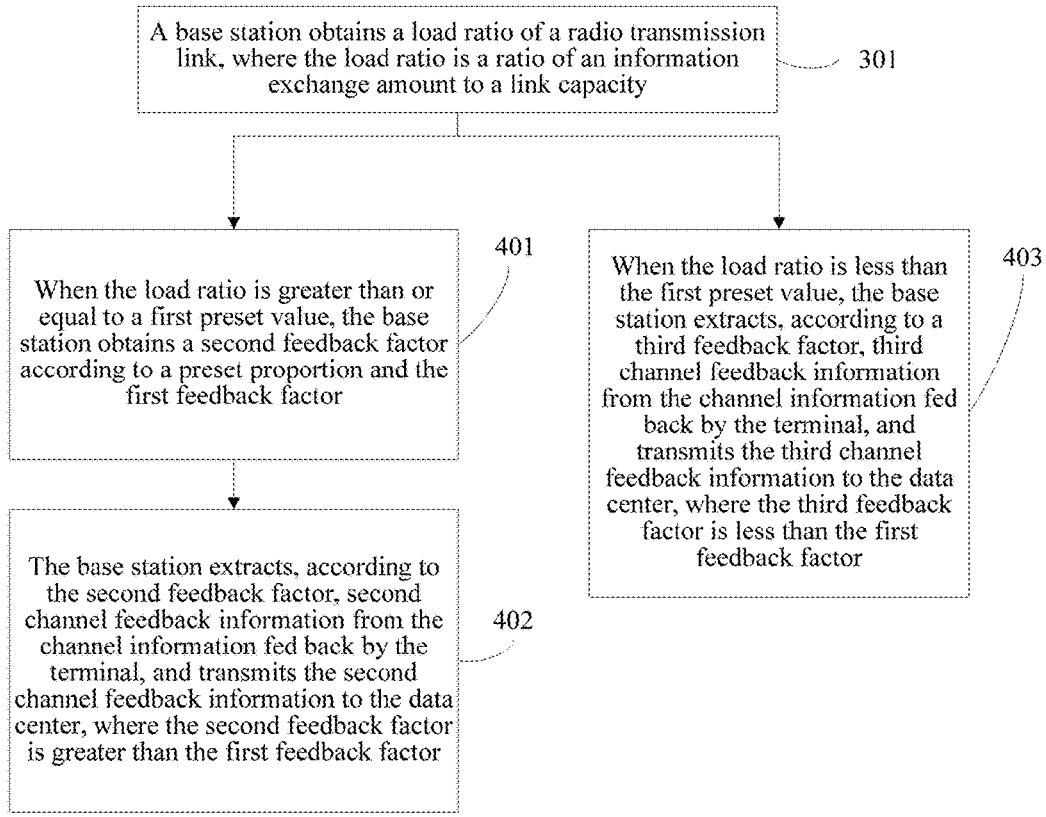
FIG. 6 is a flowchart of another channel feedback information transmission method according to an embodiment of the present application.

Optionally, as shown in FIG. 6, in another embodiment of the present application, step 302 specifically includes step 401 and step 402.

401: When the load ratio is greater than or equal to the first preset value, the base station obtains a second feedback factor according to a preset proportion and the first feedback factor.

402: The base station extracts, according to the second feedback factor, second channel feedback information from the channel information fed back by the terminal, and transmits the second channel feedback information to the data center, where the second feedback factor is greater than the first feedback factor.

Optionally, in another embodiment of the present application, after step 301, the method further includes step 403:

when the load ratio is less than the first preset value, the base station extracts, according to a third feedback factor, third channel feedback information from the channel information fed back by the terminal, and transmits the third channel feedback information to the data center, where the third feedback factor is less than the first feedback factor.

After the base station obtains the load ratio of the radio transmission link, the load ratio is compared with the first preset value, and when the load ratio is less than the first preset value, it indicates that a load capacity of the radio transmission link still has a surplus, some feedback information may be extracted, according to the preset third feedback factor, from the channel information fed back by the terminal, and is used as the third channel feedback information, and the third channel feedback information is transmitted to the data center.

The third feedback factor may be preset, or may change according to a change in the load ratio. When the channel information fed back by the terminal is extracted, the channel information is extracted according to a reciprocal of the feedback factor. For example, it is assumed that the first preset value is 50%. When the load ratio is 0% to 30%, the third feedback factor may be 1, that is, 50% of the channel information fed back by the terminal may be extracted according to the third feedback factor, be used as the first channel feedback information, and be fed back. When the load ratio is 30% to 50%, the third feedback factor may be 2, that is, 33.3% of the channel information fed back by the terminal may be extracted according to the third feedback factor, be used as the third channel feedback information, and be fed back.

Figure 7:
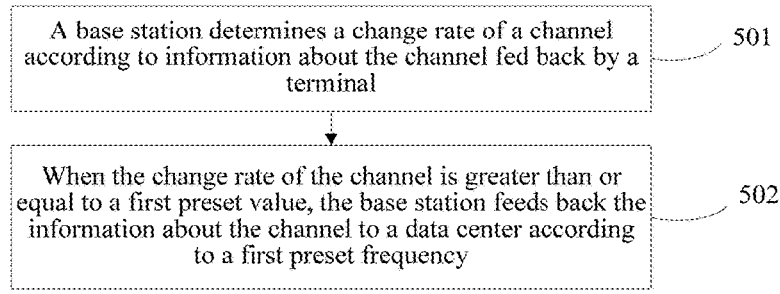
FIG. 7 is a flowchart of another channel feedback information transmission method according to an embodiment of the present application.

As shown in FIG. 7, FIG. 7 describes another channel feedback information transmission method according to an embodiment of the present application. The method is used to feed back channel information, and the method specifically includes step 501 to step 502.

501: A base station determines a change rate of a channel according to information about the channel fed back by a terminal.

The information about the channel may be a channel transmission function.

After the base station receives the information about the channel fed back by the terminal, a change speed of the channel may be determined based on a calculation of Doppler measurement. For example, the calculation may be performed according to a correlation between former and latter signal symbols by means of a simple correlation algorithm.

A frequency shift of a channel based on Doppler measurement specifically includes: first measuring an autocorrelation function of a channel time difference, then performing a Fourier transformation on the autocorrelation function to obtain a power spectrum of the channel, and finally calculating largest maximum Doppler frequency shift of the channel.

502: When the change rate of the channel is greater than or equal to a first preset value, the base station feeds back the information about the channel to a data center according to a first preset frequency.

For example, if the change rate of the channel is greater than or equal to the first preset value, it may be considered that the channel changes fast, and the base station may feed back the information about the channel to the data center according to 50 ms or 20 ms per set.

It may be known from above that, according to the channel feedback information transmission method provided in this embodiment of the present application, when the change rate of the channel is greater than or equal to the first preset value, the base station feeds back the information about the channel to a data center according to a first preset frequency, and the base station determines, according to the change rate of the channel, a frequency at which channel information is fed back to the data center, thereby improving efficiency of a communications system.

Optionally, in another embodiment of the present application, after step 502, the method further includes the following step:

when the change rate of the channel is less than the first preset value, feeding back, by the base station, the information about the channel to the data center according to a second preset frequency, where the second preset frequency is less than the first preset frequency.

When the change rate of the channel is less than the first preset value, it may be considered that the channel changes slowly, and the base station may feed back the channel information according to the second preset frequency. For example, if the channel changes slowly, a feedback may be performed on a set of channels every 100 ms, and feedback overheads may be lowered to $\frac{1}{100}$, and may be further lowered to $\frac{1}{200}$ or $\frac{1}{400}$ in combination with a frequency domain.

Figure 8:
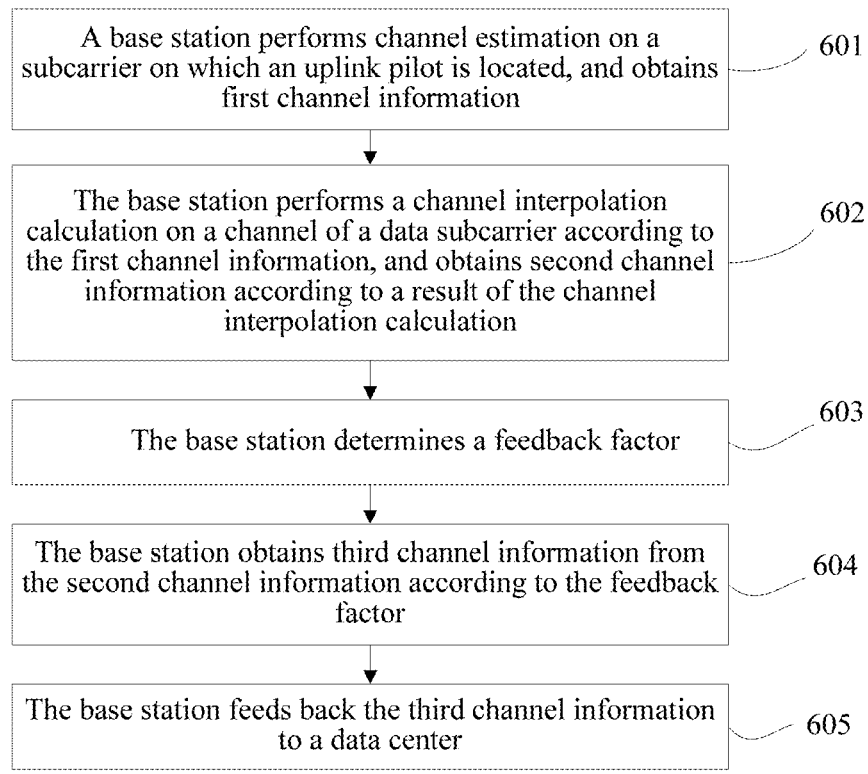
FIG. 8 is a flowchart of another channel feedback information transmission method according to an embodiment of the present application.

As shown in FIG. 8, FIG. 8 describes a channel feedback information transmission method according to an embodiment of the present application. The method is used to feed back channel information, and the method specifically includes step 601 to step 605.

601: A base station performs channel estimation on a subcarrier on which an uplink pilot is located, and obtains first channel information.

The base station may perform, by using an algorithm, such as an MMSE (Minimum Mean Square Error) algorithm or an LS (Least Square) algorithm, the channel estimation on the subcarrier on which the downlink pilot is located.

The first channel information refers to a channel transmission function of the subcarrier on which the uplink pilot is located.

602: The base station performs a channel interpolation calculation on a channel of a data subcarrier according to the first channel information, and obtains second channel information according to a result of the channel interpolation calculation.

After the channel transmission function of the pilot subcarrier is estimated, a channel response of the data subcarrier may be obtained by means of interpolation between adjacent pilot subcarriers. Commonly used interpolation algorithms include a linear interpolation algorithm, a second-order interpolation algorithm, a time-domain interpolation algorithm and other interpolation algorithms.

The second channel information refers to a channel transmission function of a pilot subcarrier and a channel transmission function of a data subcarrier.

603: The base station determines a feedback factor.

The feedback factor may be understood as a proportion of a feedback. For example, if the feedback factor is 2, channel information of a resource element is fed back every two resource elements.

604: The base station obtains third channel information from the second channel information according to the feedback factor, where an amount of the third channel information is less than an amount of the second channel information.

The base station obtains all channel information by means of the channel estimation and the interpolation calculation, and if the channel information is all fed back to a data center, a large quantity of wireless feedback channel resources are occupied.

Therefore, the base station may select some information from the second channel information as third channel information by means of the feedback factor.

The feedback factor may be preset, or may dynamically change according to the amount of the second channel information. For example, if the feedback factor is set to 3, a piece of third channel information of a resource element is determined every three REs.

605: The base station feeds back the third channel information to a data center.

After a third channel on which a feedback needs to be performed is determined according to the feedback factor, channel information of the third channel is fed back to the data center.

It may be known from above that, according to the channel feedback information transmission method provided in this embodiment of the present application, the base station obtains third channel information from the second channel information according to the feedback factor, and the base station feeds back the third channel information to a data center. Some channel information is selected and fed back by means of a feedback factor, so that a balance between performance of a communications system and channel feedback transmission overheads is reached, thereby improving efficiency of a communications system.

Optionally, in another embodiment of the present application, step 603 includes step 603a and step 603b.

603a: The base station calculates a channel variance according to the second channel information.

The base station calculates a channel of each subcarrier in a sub-band according to a channel interpolation algorithm, and then calculates a channel variance of the entire sub-band.

603b: The base station determines the feedback factor according to the channel variance and the result of the channel interpolation calculation.

The base station determines and selects the feedback factor according to a relationship between the channel variance of the entire sub-band and the result of the channel interpolation calculation.

As time elapses, the feedback factor changes.

In a frequency band, the feedback factor is determined according to a performance requirement. Therefore, a compromise between performance of a communications system and channel feedback wireless transmission overheads may be achieved by determining the feedback factor.

Optionally, in another embodiment of the present application, step 603 specifically includes:

determining, by the base station, the feedback factor according to a time-domain half-wave bandwidth of the second channel information.

It is assumed that a length of a CP of an OFDM system is K, and a size of an FFT block is N. If an OFDM signal that is first input already completes synchronization, data obtained after CP removal is performed on the input signal: $x_1, x_2, \ldots, x_{K+N}$ is: $x_{K+1}, x_{K+2}, \ldots, x_{K+N}$. N pieces of data $x_{K+1}, x_{K+2}, \ldots, x_{K+N}$ is used as an input to perform an N-FFT transformation, and an output is: $X_{K+1}, X_{K+2}, \ldots, X_{K+N}$. In the N points, some positions are pilots. It is assumed that, L points of the N points are pilots, an LS or MMSE estimation is separately performed on the L points, that is, a frequency-domain channel estimation on each pilot position is completed: $X=d \times H+N$, where X herein is data of the pilot position (that is, one piece of data of $X_{K+1}, X_{K+2}, \ldots, X_{K+N}$), H represents a frequency-domain channel of the pilot position, N represents frequency-domain noise of the pilot position, and is a Gaussian random variable satisfying that a variance is $\sigma^2$, and d is pilot data transmitted by the pilot position, and is data that is already known, for example, 1 or −1 or another complex number. The channel estimation: an LS algorithm: $H'=X(d^H d+\sigma^2)^{-1}d$.

After the frequency-domain channel of the pilot position is estimated, all frequency-domain channels of N positions are calculated by using an interpolation algorithm, and the interpolation algorithm includes an algorithm, such as Wiener filtering. Then, after an N-IFFT transformation is performed on the frequency-domain channel, channel pulses of a time domain are obtained: $h_1, h_2, \ldots, h_N$. A time-domain half-wave bandwidth may be calculated in a manner similar to that a frequency-domain bandwidth is calculated. For example, it is assumed that W satisfies $|h_W| \geq |h_i| (i=1, 2, 3 \ldots, N)$. It is assumed that W1 satisfies a minimum subscript of $$|h_{W1}| \geq \frac{1}{\sqrt{2}}|h_W|,$$

and W2 satisfies a maximum subscript of $$|h_{W2}| \geq \frac{1}{\sqrt{2}}|h_W|.$$

$W_1-W_2$ is calculated as the time-domain half-wave bandwidth. The larger bandwidth indicates that fluctuation of a frequency domain is larger, and the feedback factor is smaller (that is, a feedback needs to be performed on more channels). The smaller bandwidth indicates that fluctuation of the frequency domain is smaller, and the feedback factor is larger (that is, a feedback needs to be performed on fewer channels).

Figure 9:
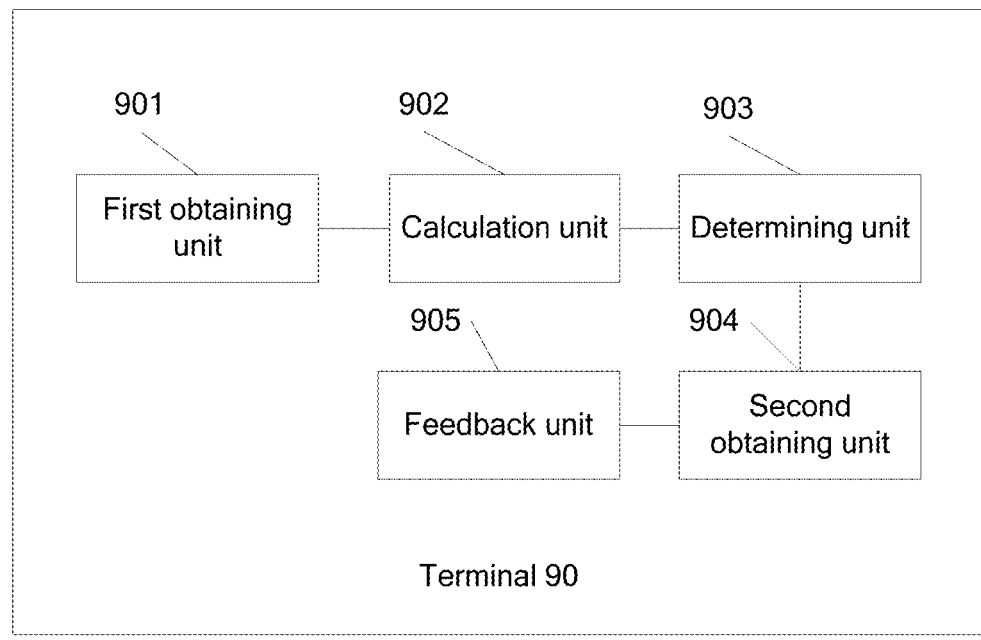
FIG. 9 is a structural diagram of apparatuses of a terminal according to an embodiment of the present application.

As shown in FIG. 9, FIG. 9 describes a terminal 90 according to an embodiment of the present application. The terminal 90 is configured to execute the channel feedback information transmission methods shown in FIG. 3 and FIG. 4. The terminal 90 includes: a first obtaining unit 901, a calculation unit 902, a determining unit 903, a second obtaining unit 904, and a feedback unit 905, where the first obtaining unit 901 is configured to perform channel estimation on a subcarrier on which a downlink pilot is located, and obtain first channel information;

the calculation unit 902 is configured to perform a channel interpolation calculation on a channel of a data subcarrier according to the first channel information obtained by the obtaining unit, and obtain second channel information according to a result of the interpolation calculation;

the determining unit 903 is configured to determine a feedback factor;

the second obtaining unit 904 is configured to obtain third channel information from the second channel information according to the feedback factor, where an amount of the third channel information is less than an amount of the second channel information; and the feedback unit 905 is configured to feed back the third channel information obtained by the second obtaining unit to a base station.

It may be known from above that, according to the terminal provided in this embodiment of the present application, the terminal obtains third channel information from the second channel information according to the feedback factor, and the terminal feeds back the third channel information to a base station. Some channel information is selected and fed back by means of a feedback factor, so that a balance between performance of a communications system and channel feedback transmission overheads is reached, thereby improving efficiency of a communications system.

Figure 10:
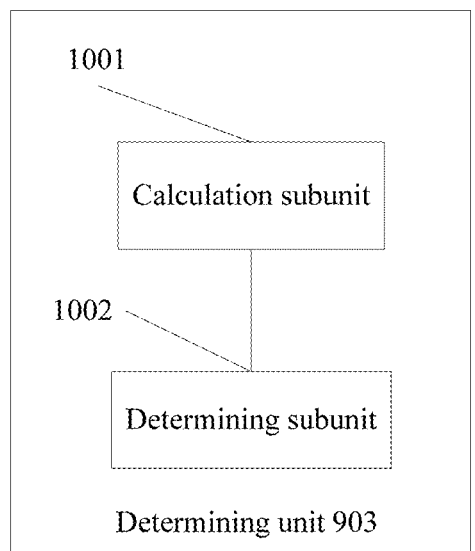
FIG. 10 is a structural diagram of a terminal according to another embodiment of the present application.

Optionally, as shown in FIG. 10, in another embodiment of the present application, the determining unit 903 includes a calculation subunit 1001 and a determining subunit 1002, where the calculation subunit 1001 is configured to calculate a channel variance according to the second channel information obtained by the calculation unit 902; and the determining subunit 1002 is configured to determine the feedback factor according to the channel variance and the result of the channel interpolation calculation.

Optionally, in another embodiment of the present application, the terminal further includes a second determining unit, where the second determining unit is configured to determine the feedback factor according to a time-domain half-wave bandwidth of the second channel information obtained by the calculation unit 902.

Figure 11:
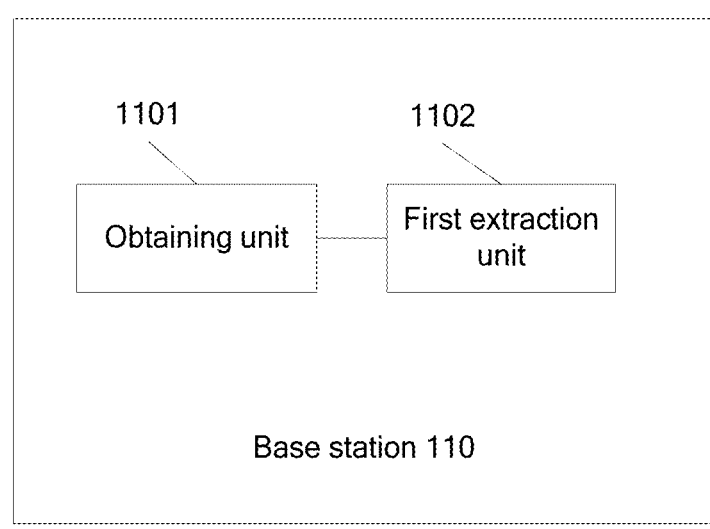
FIG. 11 is a structural diagram of a base station according to an embodiment of the present application.

As shown in FIG. 11, FIG. 11 describes a base station 110 according to an embodiment of the present application. The base station 110 is configured to execute the channel feedback information transmission methods shown in FIG. 5 and FIG. 6. The base station 110 includes: an obtaining unit 1101 and a first extraction unit 1102, where the obtaining unit 1101 is configured to obtain a load ratio of a radio transmission link, where the load ratio is a ratio of an information exchange amount to a link capacity, where the information exchange amount is an amount of information exchange between the base station and a data center within a preset period of time, and the link capacity is an amount of containable information in a link from the base station to the data center within a preset period of time, and the first extraction unit 1102 is configured to: when the load ratio is greater than or equal to a first preset value, extract, according to a first feedback factor, first channel feedback information from channel information fed back by a terminal, and transmit the first channel feedback information to the data center.

Figure 12:
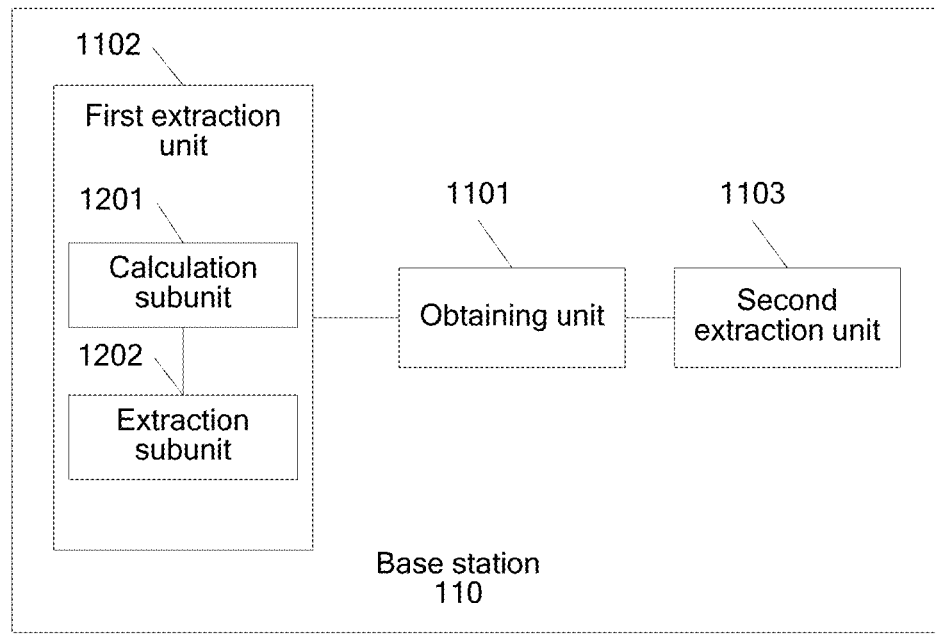
FIG. 12 is a structural diagram of a base station according to another embodiment of the present application.

Optionally, as shown in FIG. 12, in another embodiment of the present application, the first extraction unit includes a calculation subunit 1201 and an extraction subunit 1202, where the calculation subunit 1201 is configured to obtain a second feedback factor according to a preset proportion and the first feedback factor when the load ratio is greater than or equal to the first preset value; and the extraction subunit 1202 is configured to extract, according to the second feedback factor, second channel feedback information from the channel information fed back by the terminal, and transmit the second channel feedback information to the data center, where the second feedback factor is greater than the first feedback factor.

Optionally, as shown in FIG. 12, in another embodiment of the present application, the base station 110 further includes a second extraction unit 1103, where the second extraction unit 1103 is configured to: when the load ratio is less than the first preset value, extract, by the base station according to a third feedback factor, third channel feedback information from the channel information fed back by the terminal, and transmit the third channel feedback information to the data center, where the third feedback factor is less than the first feedback factor.

It may be known from above that, according to the base station provided in this embodiment of the present application, the base station obtains a load ratio of a radio transmission link, and is configured to: when the load ratio is greater than or equal to a first preset value, extract, according to a first feedback factor, first channel feedback information from channel information fed back by a terminal. Some channel information is selected and fed back by means of a feedback factor, so that a balance between a load of a radio transmission link and channel feedback transmission overheads is reached, thereby improving efficiency of a communications system.

Figure 13:
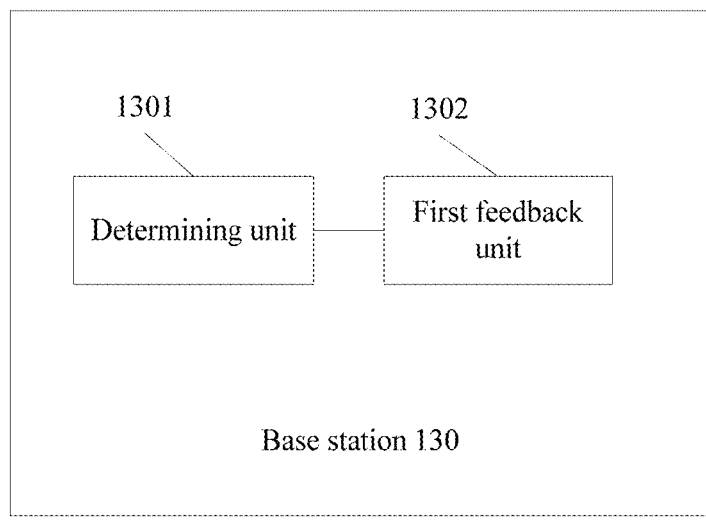
FIG. 13 is a structural diagram of a base station according to another embodiment of the present application.

As shown in FIG. 13, FIG. 13 describes a base station 130 according to an embodiment of the present application. The base station 130 is configured to execute the channel feedback information transmission method shown in FIG. 7. The base station 130 includes: a determining unit 1301 and a first feedback unit 1302, where the determining unit 1301 is configured to determine a change rate of a channel according to information about the channel fed back by a terminal; and the first feedback unit 1302 is configured to: when the change rate of the channel is greater than or equal to the first preset value, feed back, by the base station, the information about the channel to a data center according to a first preset frequency.

It may be known from above that, according to the base station provided in this embodiment of the present application, when the change rate of the channel is greater than or equal to the first preset value, the base station feeds back the information about the channel to a data center according to a first preset frequency, and the base station determines, according to the change rate of the channel, a frequency at which channel information is fed back to the data center, thereby improving efficiency of a communications system.

Optionally, in another embodiment of the present application, the base station 130 further includes a second feedback unit, where the second feedback unit is configured to: when the change rate of the channel is less than the first preset value, feed back, by the base station, the information about the channel to the data center according to a second preset frequency, where the second preset frequency is less than the first preset frequency.

Figure 14:
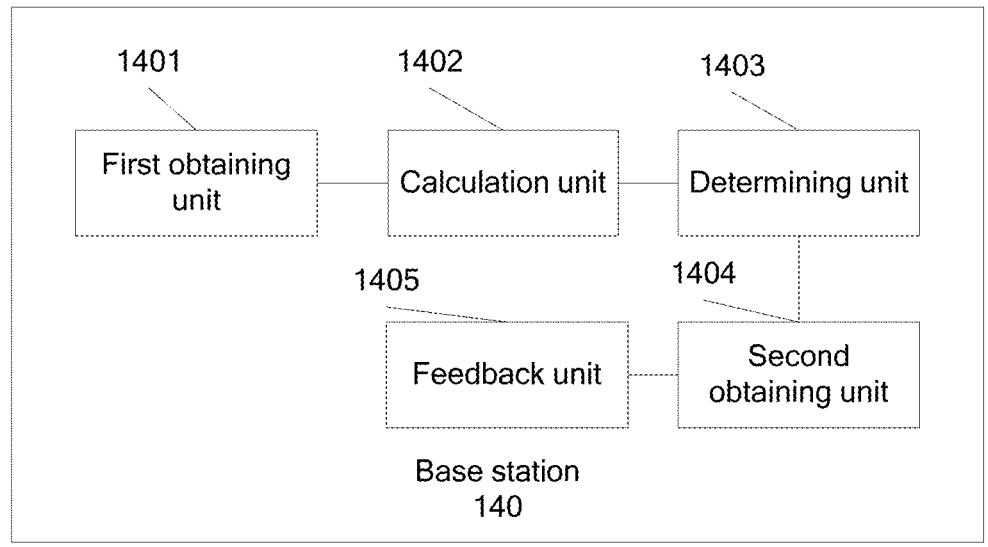
FIG. 14 is a structural diagram of a base station according to another embodiment of the present application.

As shown in FIG. 14, FIG. 14 describes a base station 140 according to an embodiment of the present application. The base station 140 is configured to execute the channel feedback information transmission method shown in FIG. 8. The base station 140 includes: a first obtaining unit 1401, a calculation unit 1402, a determining unit 1403, a second obtaining unit 1404, and a feedback unit 1405, where the first obtaining unit 1401 is configured to perform channel estimation on a subcarrier on which an uplink pilot is located, and obtain first channel information;

the calculation unit 1402 is configured to perform a channel interpolation calculation on a channel of a data subcarrier according to the first channel information obtained by the obtaining unit, and obtain second channel information according to a result of the interpolation calculation;

the determining unit 1403 is configured to determine a feedback factor;

the second obtaining unit 1404 is configured to obtain third channel information from the second channel information according to the feedback factor, where an amount of the third channel information is less than an amount of the second channel information; and the feedback unit 1405 is configured to feed back the third channel information obtained by the second obtaining unit to a data center.

It may be known from above that, according to the base station provided in this embodiment of the present application, the base station obtains third channel information from the second channel information according to the feedback factor, and the base station feeds back the third channel information to a data center. Some channel information is selected and fed back by means of the feedback factor, so that a balance between performance of a communications system and channel feedback transmission overheads is reached, thereby improving efficiency of a communications system.

Optionally, in another embodiment of the present application, the determining unit 1403 includes a calculation subunit and a determining subunit, where the calculation subunit is configured to calculate a channel variance according to the second channel information obtained by the calculation unit; and the determining subunit is configured to determine the feedback factor according to the channel variance and the result of the channel interpolation calculation.

Optionally, in another embodiment of the present application, the determining unit 1403 is configured to determine the feedback factor according to a time-domain half-wave bandwidth of the second channel information obtained by the calculation unit 1402.

Figure 15:
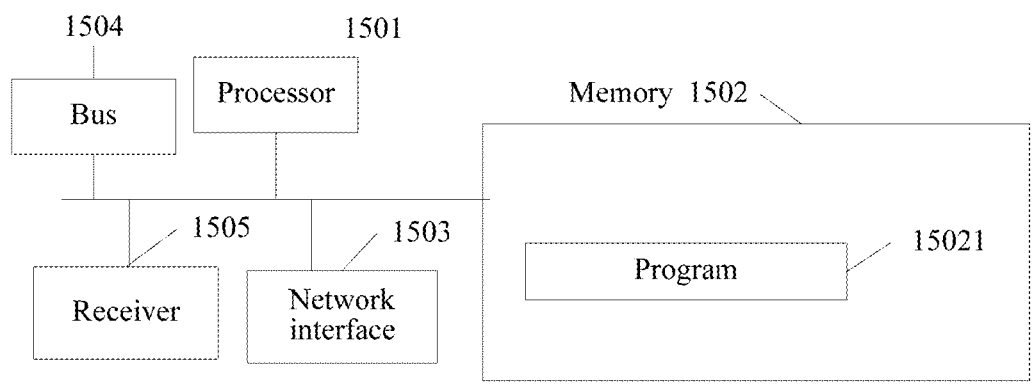
FIG. 15 is a structural diagram of entities of a terminal according to another embodiment of the present application.

FIG. 15 describes a structure of a terminal according to another embodiment of the present application. The terminal includes at least one processor 1501 (for example, a CPU, Central Processing Unit), a memory 1502, at least one network interface 1503, at least one communications bus 1504, and at least one receiver 1505, and is configured to implement connection and communication between these apparatuses. The processor 1501 is configured to execute an executable module, for example, a computer program, stored in the memory 1502. The memory 1502 may include a high-speed random access memory (RAM), and may further include a non-volatile memory, such as at least an eMMC (Embedded Multi Media Card) memory. Communication and connection between the network device and at least another network element are implemented by means of the at least one network interface 1503 (which may be wired or wireless), and the Internet, a wide area network, a local area network, a metropolitan area network, or the like may be used. The terminal is configured to execute the channel feedback information transmission method shown in FIG. 3.

In some implementation manners, the memory 1502 stores a program 15021, the program 15021 may be executed by the processor 1501, and the program includes:

performing channel estimation on a subcarrier on which a downlink pilot is located, and obtaining first channel information;

performing a channel interpolation calculation on a channel of a data subcarrier according to the first channel information, and obtaining second channel information according to a result of the channel interpolation calculation;

determining a feedback factor;

obtaining third channel information from the second channel information according to the feedback factor, where an amount of the third channel information is less than an amount of the second channel information; and feeding back the third channel information to a base station.

Specific implementation steps are the same as those in the embodiment shown in FIG. 3, and details are not described herein again.

Optionally, the determining a feedback factor includes:

calculating a channel variance according to the second channel information; and determining the feedback factor according to the channel variance and the result of the channel interpolation calculation.

Optionally, the determining a feedback factor includes:

determining the feedback factor according to a time-domain half-wave bandwidth of the second channel information.

It may be known from above that, according to the terminal provided in this embodiment of the present application, the terminal obtains third channel information from the second channel information according to the feedback factor, and the terminal feeds back the third channel information to a base station. Some channel information is selected and fed back by means of a feedback factor, so that a balance between performance of a communications system and channel feedback transmission overheads is reached, thereby improving efficiency of a communications system.

Figure 16:
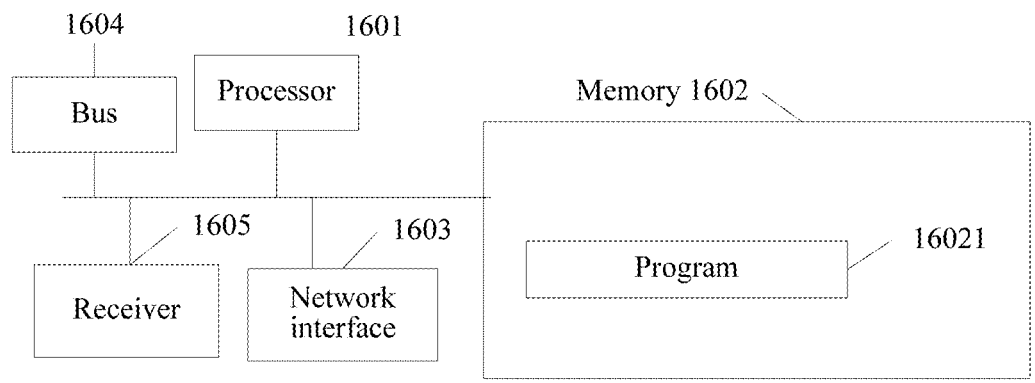
FIG. 16 is a structural diagram of entities of a base station according to another embodiment of the present application.

FIG. 16 describes a structure of a base station according to another embodiment of the present application. The base station includes at least one processor 1601 (for example, a CPU), a memory 1602, at least one network interface 1603, at least one communications bus 1604, and at least one receiver 1605, and is configured to implement connection and communication between these apparatuses. The processor 1601 is configured to execute an executable module, for example, a computer program, stored in the memory 1602. The memory 1602 may include a RAM, and may further include a non-volatile memory, such as at least an eMMC memory. Communication and connection between the network device and at least another network element are implemented by means of the at least one network interface 1603 (which may be wired or wireless), and the Internet, a wide area network, a local area network, a metropolitan area network, or the like may be used. The base station is configured to execute the channel feedback information transmission method shown in FIG. 5.

In some implementation manners, the memory 1602 stores a program 16021, the program 16021 may be executed by the processor 1601, and the program includes:

obtaining a load ratio of a radio transmission link, where the load ratio is a ratio of an information exchange amount to a link capacity, where the information exchange amount is an amount of information exchange between the base station and a data center within a preset period of time, and the link capacity is an amount of containable information in a link from the base station to the data center within a preset period of time; and when the load ratio is greater than or equal to a first preset value, extracting, according to a first feedback factor, first channel feedback information from channel information fed back by a terminal, and transmitting the first channel feedback information to the data center.

Specific implementation steps are the same as those in the embodiment shown in FIG. 5, and details are not described herein again.

Optionally, the extracting, according to a first feedback factor, first channel feedback information from channel information fed back by a terminal, and transmitting the first channel feedback information to the data center specifically includes: obtaining a second feedback factor according to a preset proportion and the first feedback factor, and extracting, according to the second feedback factor, second channel feedback information from the channel information fed back by the terminal, and transmitting the second channel feedback information to the data center, where the second feedback factor is greater than the first feedback factor.

Optionally, when the load ratio is less than the first preset value, third channel feedback information is extracted, according to a third feedback factor, from the channel information fed back by the terminal, and the third channel feedback information is transmitted to the data center, where the third feedback factor is less than the first feedback factor.

It may be known from above that, according to the base station provided in this embodiment of the present application, the base station obtains a load ratio of a radio transmission link, and when the load ratio is greater than or equal to a first preset value, the base station extracts, according to a first feedback factor, first channel feedback information from channel information fed back by a terminal. Some channel information is selected and fed back by means of the feedback factor, so that a balance between a load of a radio transmission link and channel feedback transmission overheads is reached, thereby improving efficiency of a communications system.

Figure 17:
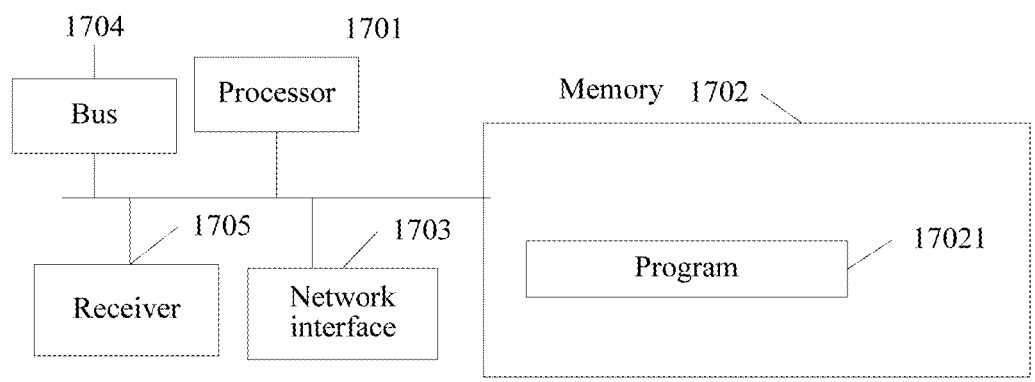
FIG. 17 is a structural diagram of entities of a base station according to another embodiment of the present application.

FIG. 17 describes a structure of a base station according to another embodiment of the present application. The base station includes at least one processor 1701 (for example, a CPU), a memory 1702, at least one network interface 1703, at least one communications bus 1704, and at least one receiver 1705, and is configured to implement connection and communication between these apparatuses. The processor 1701 is configured to execute an executable module, for example, a computer program, stored in the memory 1702. The memory 1702 may include a RAM, and may further include a non-volatile memory, such as at least an eMMC memory. Communication and connection between the network device and at least another network element are implemented by means of the at least one network interface 1703 (which may be wired or wireless), and the Internet, a wide area network, a local area network, a metropolitan area network, or the like may be used. The base station is configured to execute the channel feedback information transmission method shown in FIG. 7.

In some implementation manners, the memory 1702 stores a program 17021, the program 17021 may be executed by the processor 1701, and the program includes:

determining a change rate of a channel according to information about the channel fed back by a terminal; and when the change rate of the channel is greater than or equal to the first preset value, feeding back the information about the channel to a data center according to a first preset frequency.

Specific implementation steps are the same as those in the embodiment shown in FIG. 7, and details are not described herein again.

Optionally, when the change rate of the channel is less than the first preset value, the information about the channel is fed back to the data center according to a second preset frequency, where the second preset frequency is less than the first preset frequency.

It may be known from above that, according to the base station provided in this embodiment of the present application, when the change rate of the channel is greater than or equal to the first preset value, the base station feeds back the information about the channel to a data center according to a first preset frequency, and the base station determines, according to the change rate of the channel, a frequency at which channel information is fed back to the data center, thereby improving efficiency of a communications system.

Figure 18:
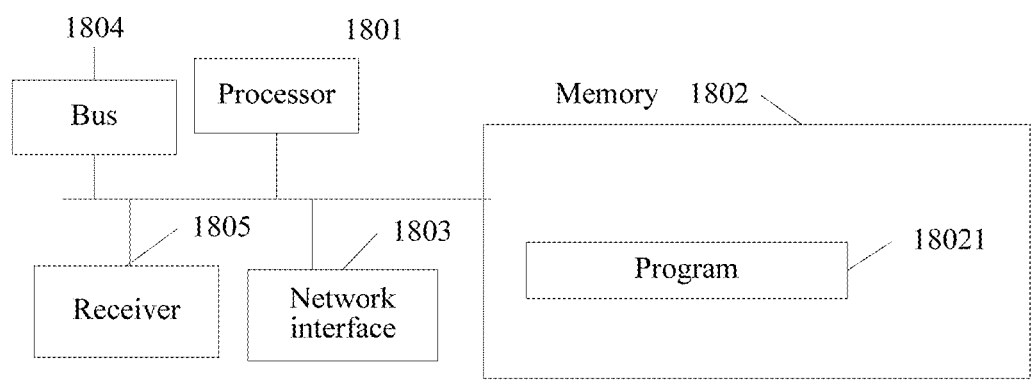
FIG. 18 is a structural diagram of entities of a base station according to another embodiment of the present application.

FIG. 18 describes a structure of a terminal according to another embodiment of the present application. The terminal includes at least one processor 1801 (for example, a CPU), a memory 1802, at least one network interface 1803, at least one communications bus 1804, and at least one receiver 1805, and is configured to implement connection and communication between these apparatuses. The processor 1801 is configured to execute an executable module, for example, a computer program, stored in the memory 1802. The memory 1802 may include a RAM, and may further include a non-volatile memory, such as at least an eMMC memory. Communication and connection between the network device and at least another network element are implemented by means of the at least one network interface 1803 (which may be wired or wireless), and the Internet, a wide area network, a local area network, a metropolitan area network, or the like may be used. The terminal is configured to execute the channel feedback information transmission method shown in FIG. 3.

In some implementation manners, the memory 1802 stores a program 18021, the program 18021 may be executed by the processor 1801, and the program includes:

performing channel estimation on a subcarrier on which an uplink pilot is located, and obtaining first channel information;

performing a channel interpolation calculation on a channel of a data subcarrier according to the first channel information, and obtaining second channel information according to a result of the channel interpolation calculation;

determining a feedback factor;

obtaining third channel information from the second channel information according to the feedback factor, where an amount of the third channel information is less than an amount of the second channel information; and feeding back the third channel information to a base station.

Specific implementation steps are the same as those in the embodiment shown in FIG. 8, and details are not described herein again.

Optionally, the determining a feedback factor includes:

calculating a channel variance according to the second channel information; and determining the feedback factor according to the channel variance and the result of the channel interpolation calculation.

Optionally, the determining a feedback factor includes: determining the feedback factor according to a time-domain half-wave bandwidth of the second channel information.

It may be known from above that, according to the terminal provided in this embodiment of the present application, the terminal obtains third channel information from the second channel information according to the feedback factor, and the terminal feeds back the third channel information to a data center. Some channel information is selected and fed back by means of the feedback factor, so that a balance between performance of a communications system and channel feedback transmission overheads is reached, thereby improving efficiency of a communications system.

It should be noted that, for brief description, the foregoing method embodiments are represented as a series of actions. However, a person skilled in the art should appreciate that the present application is not limited to the described order of the actions, because according to the present application, some steps may be performed in other orders or simultaneously. In addition, a person skilled in the art should also understand that all the embodiments described in this specification belong to exemplary embodiments, and the involved actions and modules are not necessarily mandatory to the present application.

Content such as information exchange and an execution process between the modules in the foregoing apparatus and system is based on a same idea as the method embodiments of the present application. Therefore, for detailed content, refer to descriptions in the method embodiments of the present application, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a magnetic disk, an optical disc, a read-only memory (ROM), a RAM, or the like.

In this specification, specific examples are used to describe the principle and implementation manners of the present application, and the description of the embodiments is only intended to help understand the method and idea of the present application. Meanwhile, a person of ordinary skill in the art may, based on the idea of the present application, make modifications with respect to the specific implementation manners and the application scope. Therefore, the content of this specification shall not be construed as a limitation to the present application.

What is claimed is:

1. A channel feedback information transmission method, wherein the method comprises:

performing, by a terminal, channel estimation on a subcarrier on which a downlink pilot is located, and obtaining first channel information:

performing, by the terminal, a channel interpolation calculation on a channel of a data subcarrier according to the first channel information, and obtaining second channel information according to a result of the channel interpolation calculation;

determining, by the terminal, a first feedback factor;

obtaining, by the terminal, third channel information from the second channel information according to the first feedback factor, wherein an amount of the third channel information is less than an amount of the second channel information; and feeding back, by the terminal, the third channel information to a base station.

2. The method according to claim 1, further comprising:

obtaining, by the base station, a load ratio of a radio transmission link, wherein the load ratio is a ratio of an information exchange amount to a link capacity, wherein the information exchange amount is an amount of information exchange between the base station and a data center within a preset period of time, and the link capacity is an amount of containable information in a link from the base station to the data center within a preset period of time; and when the load ratio is greater than or equal to a first preset value, extracting, by the base station according to a second feedback factor, first channel feedback information from the first channel information fed back by the terminal, and transmitting the first channel feedback information to the data center.

3. The method according to claim 2, wherein the extracting, by the base station according to a second feedback factor, the first channel feedback information from the first channel information fed back by the terminal, and transmitting the first channel feedback information to the data center comprises:

obtaining, by the base station, a third feedback factor according to a preset proportion and the second feedback factor; and extracting, by the base station according to the third feedback factor, second channel feedback information from the first channel information fed back by the terminal, and transmitting the second channel feedback information to the data center, wherein the third feedback factor is greater than the second feedback factor.

4. The method according to claim 2, wherein the method further comprises:

when the load ratio is less than the first preset value, extracting, by the base station according to a fourth feedback factor, third channel feedback information from the first channel information fed back by the terminal, and transmitting the third channel feedback information to the data center, wherein the fourth feedback factor is less than the second feedback factor.

5. The method according to claim 1, further comprising:

determining, by the base station, a change rate of a channel according to information about the channel fed back by the terminal; and when the change rate of the channel is greater than or equal to a first preset value, feeding back, by the base station, the information about the channel to a data center according to a first preset frequency.

6. The method according to claim 5, wherein the method further comprises:
when the change rate of the channel is less than the first preset value, feeding back, by the base station, the information about the channel to the data center according to a second preset frequency, wherein the second preset frequency is less than the first preset frequency.

7. A channel feedback information transmission method, wherein the method comprises:
performing, by a base station, channel estimation on a subcarrier on which an uplink pilot is located, and obtaining first channel information;
performing, by the base station, a channel interpolation calculation on a channel of a data subcarrier according to the first channel information, and obtaining second channel information according to a result of the channel interpolation calculation;
determining, by the base station, a first feedback factor;
obtaining, by the base station, third channel information from the second channel information according to the first feedback factor, wherein an amount of the third channel information is less than an amount of the second channel information; and
feeding back, by the base station, the third channel information to a data center.

8. The method according to claim 7, wherein the determining, by the base station, a feedback factor comprises:
calculating, by the base station, a channel variance according to the second channel information; and
determining, by the base station, the feedback factor according to the channel variance and the result of the channel interpolation calculation.

9. The method according to claim 7, wherein the determining, by the base station, a feedback factor comprises;
determining, by the base station, the feedback factor according to a time-domain half-wave bandwidth of the second channel information.

10. A terminal, wherein the terminal comprises:
a first obtaining unit, configured to perform channel estimation on a subcarrier on which a downlink pilot is located, and obtain first channel information;
a calculation unit, configured to perform a channel interpolation calculation on a channel of a data subcarrier according to the first channel information obtained by the obtaining unit, and obtain second channel information according to a result of the interpolation calculation;
a determining unit, configured to determine a feedback factor;
a second obtaining unit, configured to obtain third channel information from the second channel information according to the feedback factor determined by the determining unit, wherein an amount of the third channel information is less than an amount of the second channel information; and
a feedback unit, configured to feed back the third channel information obtained by the second obtaining unit to a base station.

11. The terminal according to claim 10, wherein the determining unit comprises
a calculation subunit and a determining subunit, wherein the calculation subunit is configured to calculate a channel variance according to the second channel information obtained by the calculation unit; and
the determining subunit is configured to determine the feedback factor according to the channel variance and the result of the channel interpolation calculation.

12. The terminal according to claim 10, wherein the determining unit is configured to determine the feedback factor according to a time-domain half-wave bandwidth of the second channel information.

13. A base station, wherein the base station comprises:
a first obtaining unit, configured to perform channel estimation on a subcarrier on which an uplink pilot is located, and obtain first channel information;
a calculation unit, configured to perform a channel interpolation calculation on a channel of a data subcarrier according to the first channel information obtained by the obtaining unit, and obtain second channel information according to a result of the interpolation calculation;
a determining unit, configured to determine a feedback factor;
a second obtaining unit, configured to obtain third channel information from the second channel information according to the feedback factor, wherein an amount of the third channel information is less than an amount of the second channel information; and
a feedback unit, configured to feed back the third channel information obtained by the second obtaining unit to a data center.

14. The base station according to claim 13, wherein the determining unit comprises a calculation subunit and a determining subunit, wherein
the calculation subunit is configured to calculate a channel variance according to the second channel information obtained by the calculation unit; and
the determining subunit is configured to determine the feedback factor according to the channel variance and the result of the channel interpolation calculation.

15. The base station according to claim 13, wherein the determining unit is configured to determine the feedback factor according to a time-domain half-wave bandwidth of the second channel information.

16. The method according to claim 7, further comprising:
obtaining, by the base station, a load ratio of a radio transmission link, wherein the load ratio is a ratio of an information exchange amount to a link capacity, wherein the information exchange amount is an amount of information exchange between the base station and a data center within a preset period of time, and the link capacity is an amount of containable information in a link from the base station to the data center within a preset period of time; and
when the load ratio is greater than or equal to a first preset value, extracting, by the base station according to a second feedback factor, first channel feedback information from channel information fed back by a terminal, and transmitting the first channel feedback information to the data center.

17. The method according to claim 16, wherein the extracting, by the base station according to a second feedback factor, the first channel feedback information from channel information fed back by the terminal, and transmitting the first channel feedback information to the data center comprises:
obtaining, by the base station, a third feedback factor according to a preset proportion and the second feedback factor: and
extracting, by the base station according to the third feedback factor, second channel feedback information from the channel information fed back by the terminal, and transmitting the second channel feedback information to the data center, wherein the third feedback factor is greater than the second feedback factor.

18. The method according to claim 16, wherein the method further comprises:
when the load ratio is less than the first preset value, extracting, by the base station according to a fourth feedback factor, third channel feedback information from the channel information fed back by the terminal, and transmitting the third channel feedback information to the data center, wherein the fourth feedback factor is less than the second feedback factor.

19. The method according to claim 7, further comprising:
determining, by the base station, a change rate of a channel according to channel information about the channel fed back by a terminal; and when the change rate of the channel is greater than or equal to a first preset value, feeding back, by the base station, the channel information about the channel to the data center according to a first preset frequency.

20. The method according to claim 19, wherein the method further comprises:
when the change rate of the channel is less than the first preset value, feeding back, by the base station, the information about the channel to the data center according to a second preset frequency, wherein the second preset frequency is less than the first preset frequency.

* * * * *